United States Patent [19]

Kotarra et al.

[11] Patent Number: 5,273,139
[45] Date of Patent: Dec. 28, 1993

[54] BRAKE CYLINDER FOR THE ACTUATION OF A VEHICLE BRAKE

[75] Inventors: Bruno Kotarra, Gronau; Horst Mylius; Wolfgang Pohl, both of Garbsen; Momcilo Ristic, Hanover, all of Fed. Rep. of Germany

[73] Assignee: WABCO Westinghouse Fahrzeugbremsen GmbH, Hannover, Fed. Rep. of Germany

[21] Appl. No.: 769,630

[22] Filed: Sep. 30, 1991

[30] Foreign Application Priority Data

Oct. 11, 1990 [DE] Fed. Rep. of Germany ....... 4032211

[51] Int. Cl.$^5$ .............................................. F16D 65/22
[52] U.S. Cl. ...................................... 188/362; 188/152
[58] Field of Search ............... 188/151 A, 152, 153 D, 188/361, 366, 362, 365

[56] References Cited

U.S. PATENT DOCUMENTS 1,707,258  4/1929  Down ................................. 188/362

FOREIGN PATENT DOCUMENTS

| 0272227 | 6/1988 | European Pat. Off. . | |
|---|---|---|---|
| 1625548 | 4/1970 | Fed. Rep. of Germany . | |
| 8517353 | 10/1986 | Fed. Rep. of Germany . | |
| 3727355 | 3/1989 | Fed. Rep. of Germany . | |
| 3909904 | 10/1990 | Fed. Rep. of Germany . | |
| 2208755 | 9/1992 | Fed. Rep. of Germany . | |
| 622767 | 6/1961 | France | 188/361 |
| 932591 | 7/1963 | United Kingdom | 188/362 |
| 2082273 | 3/1982 | United Kingdom | 188/362 |

Primary Examiner—Matthew C. Graham
Attorney, Agent, or Firm—Horst M. Kasper

[57] ABSTRACT

A brake cylinder is disclosed featuring a reduction of weight and a construction for reducing a tendency to vibrate. The piston (11), serving for the brake actuation, is formed out of a plastic mold part and is furnished with a simplified guiding of the piston. A pressure piece (44) serves for the transfer of the braking force, and is formed at the brake cylinder as a plastic mold part for allowing a relatively large distance from the brake drum. The new brake cylinder can be used advantageously for vehicles with wedge expanding brakes, where the brake force is transmitted by and applied with a pressure agent.

40 Claims, 4 Drawing Sheets

BRAKE CYLINDER FOR THE ACTUATION OF A VEHICLE BRAKE

BACKGROUND OF THE INVENTION

1. Field of the Invention

The Invention relates to a brake cylinder for the actuation of a vehicle brake, where a pressure chamber is furnished, wherein a movable membrane closes the pressure chamber, and wherein the pressure chamber can be subjected to a pressure agent for brake actuation, wherein a piston is furnished as a single piece mold part with a pressure plate and a piston shaft, where the piston is supported on the membrane and the piston can perform an actuating stroke with the membrane, where the piston shaft is furnished at its free end with a pressure piece, with a recess, which serves for the receiving of the actuating tappet for the actuation of the brake, wherein the brake cylinder includes a guide tube, where the piston shaft, the pressure piece and the actuating tappet are longitudinally movable disposed in the guide tube.

2. Brief Description of the Background of the Invention Including Prior Art

Such a brake cylinder is known from the printed European Patent Document EP-0 272 227 A2. A membrane as a movable wall performs a stroke in a pressure chamber of a brake cylinder based on its structure and its position upon subjection of the membrane to a force, where the stroke is transferred via a piston and an actuator tappet onto a device, which device is suitable to bring brake shoes to rest at a brake drum. A part formed as a pressure piece for receiving of the actuating tappet is disposed between the piston and the actuator tappet in the extension direction of the piston shaft. The pressure piece is furnished with a guide element formed as a piston cup with support elements and the pressure piece is guided longitudinally in a guide tube.

The conventional brake cylinder is employed for the actuation of wedge expanding brakes and is attached in connection with this property at a non-movable part of the wheel, i.e. at the brake drum. The attachment is performed in such a way that the guide tube is rigidly connected to the brake drum via a screw connection with its end disposed remote relative to the brake cylinder and such that the guide tube serves a free supporting connection element between the brake drum and the brake cylinder.

The advantageous property of the wedge expanding brake as compared to a conventional brake construction includes amongst others a reduction in the expanditure for the brake linkage and therewith associated a decrease of the elasticity of the linkage, where the elasticity of the linkage usually has to be compensated during braking as an undesired over throw. However, the brake cylinder, represents a mass in the recited attachment, which mass can introduce driving vibrations from the wheel or, respectively from the axle to the vehicle frame via the free supporting guide tube. The construction length of the guide tube represents a means for an overcoming of the distance between the brake cylinder and the brake drum, corresponding to the constructive realities or, respectively the available space in the region of the wheel and the brake drum, such that in case of wide tires or a lack of space based on a constructive embodiment of the spring suspension support on the axle, there can become necessary a longer guide tube with the disadvantage of an unfavorable displacement of the center of gravity. Therefore, a requirement exists for keeping the oscillating mass as low as possible, based on constructive elements and means, for purposes of reliability and extended life time of the brake device.

SUMMARY OF THE INVENTION

1. Purposes of the Invention

It is an object of the present invention to improve the recited brake cylinder, such that the brake cylinder can be formed with lower constructive expenditure, as compared to the recited conventional brake cylinder and such that the weight is decreased of the device components forming the vibrating and non-damped mass of the brake cylinder.

It is another object of the present invention to provide an improved brake cylinder with a decreased tendency to generate oscillations provided by a reduction of weight and by constructive features.

It is yet a further object of the present invention to provide an economical and reliable brake cylinder which is particularly adapted to actuate wedge expanding brakes.

These and other objects and advantages of the present invention will become evident from the description which follows.

2. Brief Description of the Invention

The present invention provides for a brake cylinder for actuating a vehicle brake. A pressure chamber is closed with a movable membrane. A fluid port is attached to the pressure chamber for applying a pressure agent to the pressure chamber for inducing a brake actuation. A piston includes a pressure plate and a piston body. The piston with its pressure plate and its piston body is formed from a single element plastic mold part. The piston is supported on the membrane and is adapted to perform a brake actuating stroke together with the membrane. An actuator tappet transmits a brake force to the brake. A pressure piece is attached to the piston body at the free end of the piston body. The pressure piece includes a recess serving for contacting and pushing of the actuator tappet for the actuation of the brake. A guide tube is furnished for the brake cylinder. The piston body, the pressure piece and the actuator tappet are longitudinal movably disposed in the guide tube. The piston body is guided immediately sliding in the guide tube. Means connect the piston body and the pressure piece to each other in a form engaging way.

A body seal can be disposed in the sliding region of the piston body and of the guide tube. The piston body can be sealed versus the guide tube with the body seal. The piston body can exhibit a body annular recess in the region of the piston body sliding in the guide tube. The body annular recess can receive and support the body seal.

The guide tube can exhibit a tube annular recess in a region of the guide tube sliding with the piston body. The tube annular recess can receive and support a tube seal.

Means for the form engaging connection can be formed by a catch connection disposed between the piston body and the pressure piece. The catch connection can be formed by an annular recess of the pressure piece and of a protrusion of the piston body in the direction toward the annular recess.

The piston can include a stop. The stop can serve for allowing a front face resting of the pressure piece in case of a locked-in catch connection of piston body and pressure piece.

The stop and the catch connection can be formed such and can be disposed such, relative to each other, that a play distance can be present between a front face of the stop and a front face of the pressure piece. The front face of the stop and the front face of the pressure piece can be disposed coordinated to each other.

Means for balancing the play distance can be furnished as washer disks. The means for balancing the play distance can comprise a screw turned in and aligned along a longitudinal direction of the pressure piece and of a thread in the pressure piece.

The pressure piece can be longitudinal movably guided in the guide tube The pressure piece can be shape-matching and shape-locking connected to the guide piece for the longitudinal guiding of the pressure piece in the guide tube.

The guide piece can exhibit an extension annular recess for an extension seal. The guide piece can be sealed relative to the guide tube by the extension seal.

The pressure piece can be formed of a plastic mold part. The pressure piece can exhibit a recess. The recess can serve for receiving and pushing of the actuator tappet for the actuating of the brake The recess can be formed out of a part with high wear resistance. The part forming the recess can be connected with an end of the pressure piece disposed toward the actuating tappet and can be cast into the pressure piece.

A wiper ring can be attached to the guide tube on a side disposed toward the piston A sealing lip can be attached to the guide tube on a side disposed toward the piston and can surround slidingly the piston body.

The pressure piece can exhibit a guide piece serving for the guiding of the pressure piece in the guide tube. The pressure piece and the guide piece can be formed of a single element plastic mold part. The guide piece can include an annular shaped molded extension recess for receiving an extension seal.

According to the present invention there is further provided for a production method for a brake cylinder for actuating a vehicle brake. A pressure chamber is formed and closed with a movable membrane. A fluid port is attached to the pressure chamber for allowing application of a pressure agent to the pressure chamber for inducing a brake actuation. A piston is molded including a pressure plate and a piston body as a single element plastic mold part. The piston is supported on the membrane and is adapted to perform a brake actuating stroke together with the membrane. A pressure piece is attached to the piston body at the free end of the piston body in a form engaging way. The pressure piece includes a recess serving for contacting and pushing of an actuator tappet for the actuation of the brake. The piston body, the pressure piece and the actuator tappet are surrounded with a guide tube. The piston body, the pressure piece and the actuator tappet are longitudinal movably disposed in the guide tube. The piston body is guided immediately sliding in the guide tube.

The piston body and the pressure piece can be locked together with a catch connection disposed between the piston body and the pressure piece providing said form engaging connection.

A front face of the pressure piece can be placed resting against a front face of a stop of the piston body.

A play distance can be formed between a front face of the stop and a front face of the pressure piece. The front face of the stop and the front face of the pressure piece can be disposed coordinated to each other.

The play distance can be compensated.

Washer disks can be disposed between the pressure piece and the piston for compensating the play distance.

A screw can be aligned and turned in along a longitudinal direction of the pressure piece and of a thread in the pressure piece.

The invention is associated with the advantage that possible distance variations between the brake cylinder and the brake drum can be disengageably connected and assembled with preproduced device parts furnishing a simple shape-matching connection in the kind of a construction kit or of an erector set.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

Figure 1:
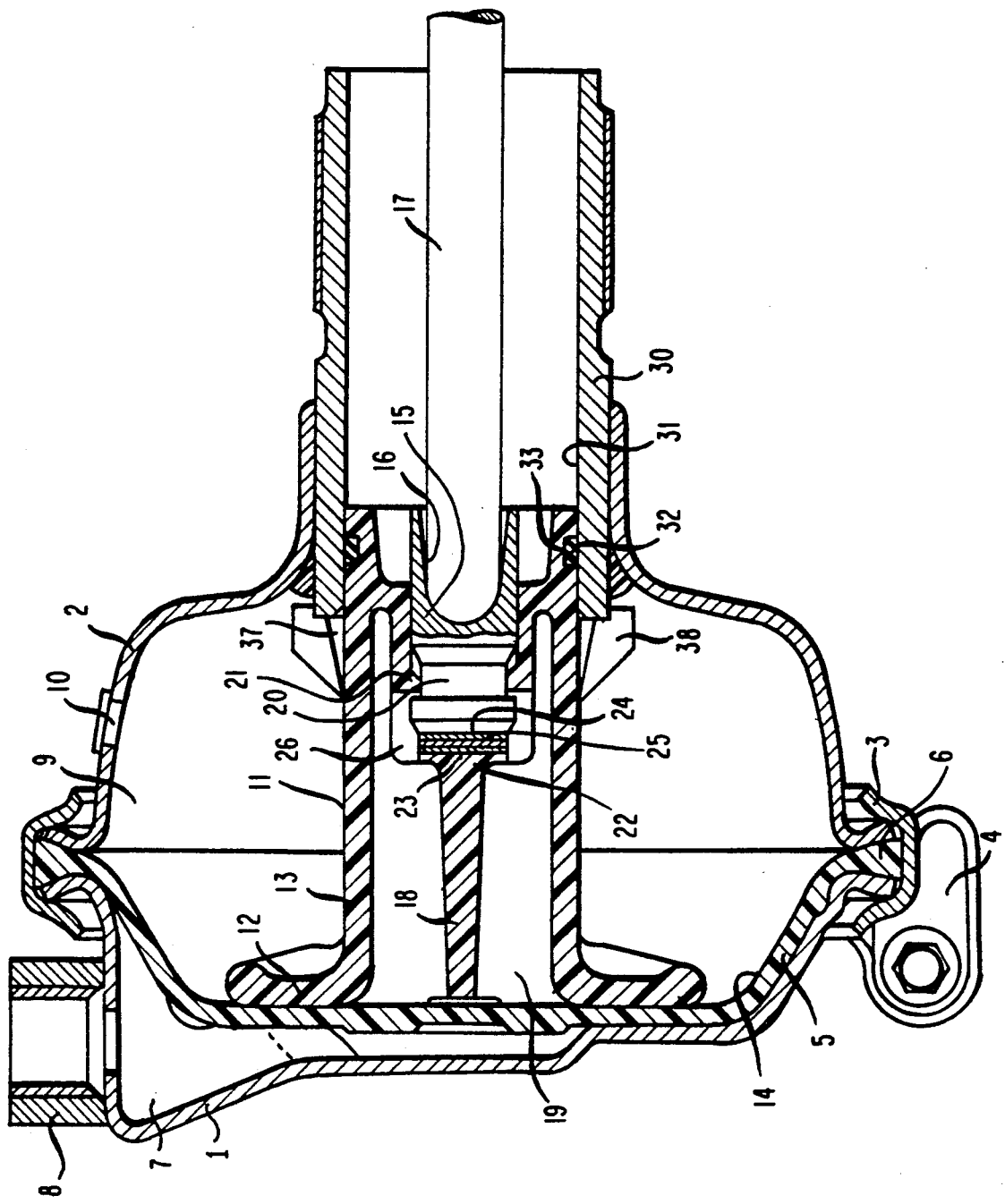
FIG. 1 shows a longitudinal sectional view of a brake cylinder.

The present invention provides for a brake cylinder for the actuating of a vehicle brake A pressure chamber is closed with a movable membrane The pressure chamber is subjectable to a pressure agent for brake actuation. A piston, furnished with a pressure plate and a piston body is formed as a single element mold piece. The piston is supported on the membrane The piston can perform a brake actuating stroke together with the membrane. A pressure piece is furnished to the piston body at the free end of the piston body. The pressure piece is furnished with a recess serving for receiving of an actuator tappet for the actuation of the brake. A guide tube is furnished for the brake cylinder. The piston body, the pressure piece and the actuator tappet are longitudinally movably disposed in the guide tube. The piston 11 with its pressure plate 12 and its piston body 13 is formed from a single element plastic mold part. The piston body 13 is guided immediately sliding in the guide tube 30, 36. Means are connecting the piston body 13 and the pressure piece 15, 40, 44 to each other in a form engaging way.

A body seal 32 can be disposed in the sliding region of the piston body 13 and of the guide tube 30, 36, by way of which body seal the piston body 13 can be sealed versus the guide tube 30, 36. The piston body 13 can exhibit a body annular recess 33 in the region of the piston body 13 sliding in the guide tube 30, 36. The body annular recess 33 can receive and support the body seal 32. The guide tube 30, 36 can exhibit a tube annular recess 34 in a region of the guide tube 30, 36 sliding with the piston body 13. The tube annular recess 34 can receive and support a tube seal 35.

The means connecting the pressure body 13 and the pressure piece 15, 40, 44 can be formed by a catch connection 20, 21, disposed between the piston body 13 and the pressure piece 15, 40, 44. The catch connection 20, 21 can be formed by an annular recess 20 of the pressure piece 15, 40, 44 and of a protrusion 21 of the piston body 13, extending in the direction toward the recess 20.

The piston 11 can exhibit a stop 22. The stop 22 can serve for providing the front face resting of the pressure piece 15, 40, 44 in case of a locked-in catch connection 20, 21 of piston body 13 and pressure piece 15, 40, 44.

The stop 22 and the catch connection 20, 21 can be formed such and can be disposed such, relative to each other, that a play distance can be present between the front faces 23, 24 of the stop 22 and of the pressure piece 15, 40, 44 disposed coordinated to each other.

Means for balancing the play distance can be furnished as washer disks 25. The means for balancing the play distance can comprise a screw 27 turned in and aligned along a longitudinal direction of the pressure piece 15, 40 and of a thread 39 in the pressure piece 15, 40.

The pressure piece 15, 40, 44 can be longitudinal movably guided in the guide tube 30, 36. The pressure piece 40 can be shape-matching and shape-locking connected to the guide piece 41 for the longitudinal guiding of the pressure piece 40 in the guide tube 36. The guide piece 41 can exhibit an extension annular recess 42 with an extension seal 43. The guide piece 41 can be sealed relative to the guide tube 36 by the extension seal 43.

The pressure piece 44 can be formed of a plastic mold part. The pressure piece 44 can exhibit a recess 47. The recess 47 can serve for receiving of the actuator tappet 17 for the actuating of the brake. The recess 47 can be formed out of a part 46 with high wear resistance. The part 46 can be connected with the end of the pressure piece 44 disposed toward the actuating tappet 17. The part 46 forming the recess 47 can be cast into the pressure piece 44.

The guide tube 30, 36 can be furnished and can be disposed toward the piston 11 with a wiper ring 37, and with a sealing lip 38. The sealing lip 38 can surround slidingly the piston body 13.

The pressure piece 44 can exhibit a guide piece 45 serving for the guiding of the pressure piece 44 in the guide tube 36. The pressure piece 44 and the guide piece 45 can be formed of a single element plastic mold part. The guide piece 45 can exhibit an annular shaped molded extension recess 48 for the receiving of an extension seal 43.

Device elements which are employed in FIGS. 1 through 5 are furnished with the same reference numerals even though the detail structure of the embodiment may vary to some extent.

FIG. 1 illustrates a brake cylinder with two halves of casing 1 and 2. The two casing halves 1 and 2 are held together against each other with a clamping band 3 and a clamping lock 4, such that a membrane 5 is clamped with its outer rim 6 between the casing halves 1 and 2 and such that the membrane 5 operates at its position simultaneously as a sealing element. The casing half 1 together with the membrane 5 representing a movable wall forms a pressure chamber 7. The pressure chamber 7 is subjectable to compressed air via a pressure port 8 and can be emptied via the pressure port 8. The second casing half 2 together with a membrane 5 forms a chamber 9, where the membrane 5 can perform a stroke in the chamber 9 upon subjection to compressed air, where the stroke serves for the actuation of the brake. The chamber 9 is connected to the atmosphere via a breather bore 10.

A piston 11, formed of a pressure plate 12 and a piston shaft 13, rests with its pressure plate 12 at a side 14 of the membrane 5, where the side 14 is disposed opposite to the position of the pressure chamber 7. The piston 11 is furnished with a pressure piece 15, which exhibits a recess 16. The recess 16 serves for receiving an actuator tappet 17, where the actuator tappet 17 is in effective actuator connection with a brake actuating element, not illustrated. The piston 11 is furnished with a rib system 18, 19 in the interior of the piston body 13 for stiffening purposes of the piston 11.

The piston 11 is produced from a single piece molded part of plastic. The piston 11 and the pressure piece 15 are shape-matchingly connected to each other. The shape-matching connection is effected by a catch connection 20, 21. The catch connection 20, 21 is formed by an annular shaped recess 20 of the pressure piece 15 and of protrusions 21, extending in the direction toward the recess 20 and disposed in the interior of the piston shaft 13. The protrusions 21 form a fixed component of the piston shaft 13 and are formed like tongues. The catch connection 20, 21 allows a disengagable joining of the piston 11 and of the pressure piece 15 with a simple means and low expanditure under advantageous exploitation of the elastic properties of the plastic.

The protrusion 21 can extend over a full circle or over a part circle, for example over 180° being subdivided uniformly into two, three or four sections. The piston body includes an inner annular shoulder which is shaped to match the outer diameter of the pressure piece 15. The annular shoulder is furnished with a tubular extension or arms cut out of a tubular extension in a direction toward the membrane 5, where the protrusion 21 is disposed as an inner shoulder on the tubular extension or on the arms cut out of the tubular extension. The protrusion 21 is formed such that a retraction of the actuating tappet 17 away from the membrane will carry the piston body 13 along by locking the protrusion 21 into the recess 20.

The piston shaft 13 exhibits projection 22 emanating and projecting from the rib system 18, 19. The projection 22 serves as a stop 22 for the pressure piece 15 in the direction toward the piston shaft 13. The stop furnished by the projection 22 and the catch connection 20, 21 are formed such and are disposed such relative to each other, that a certain play is available and present between the front faces 23, 24 of the stop furnished by the projection 22 and the front faces of the pressure piece 15 disposed abutting and coordinated to each other, wherein the front face 23 is disposed on projection 22 and wherein front face 24 is disposed on the pressure piece 15. This play serves for the balancing of a construction assembly caused tolerances between the actuator tappet 17 and the brake actuating elements under employment of a play balancing means. Washers 25 are furnished for the balancing of the play. The washers 25 are inserted between the front face 23 of the projection 22 furnishing the stop and the front face 24 of the pressure piece 15 in a recess 26 of the piston shaft 13.

Figure 4:
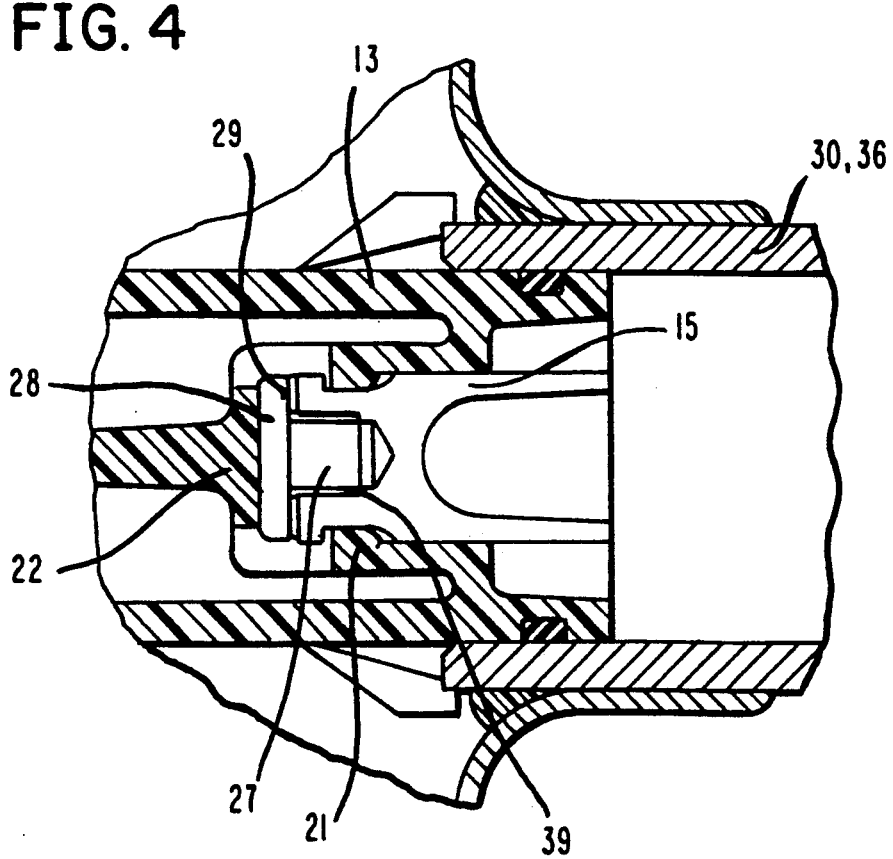
FIG. 4 shows a longitudinal sectional view similar to FIG. 3 of a detail of another embodiment of a brake cylinder in the area of the piston.

A screw 27 is furnished for the balancing and compensation of the play between the stop 22 and the pressure piece 15 according to another embodiment illustrated in FIG. 4. The screw 27 can be attached to the pressure piece 15 and aligned along a piston axis. The screw 27 is furnished with a correspondingly shaped head, where the screw head 28 is formed such, that it can serve as a stop face for the pressure piece 15. The fixation of the screw to the pressure piece 15 can be performed under consideration of the play to be filled with washer disks 29 disposed under the screw head 28, by way of differently preproduced thicknesses of the screw head 28 or by way of adhesive agents, which fix the thread relative to the thread connection. The embodiment according to FIG. 4 is associated with the advantage relative to a storage requirement of assembly elements, in that the play compensating means can be fixedly connected to the pressure piece 15 and thereby forming together a single preproduced device component.

Figure 3:
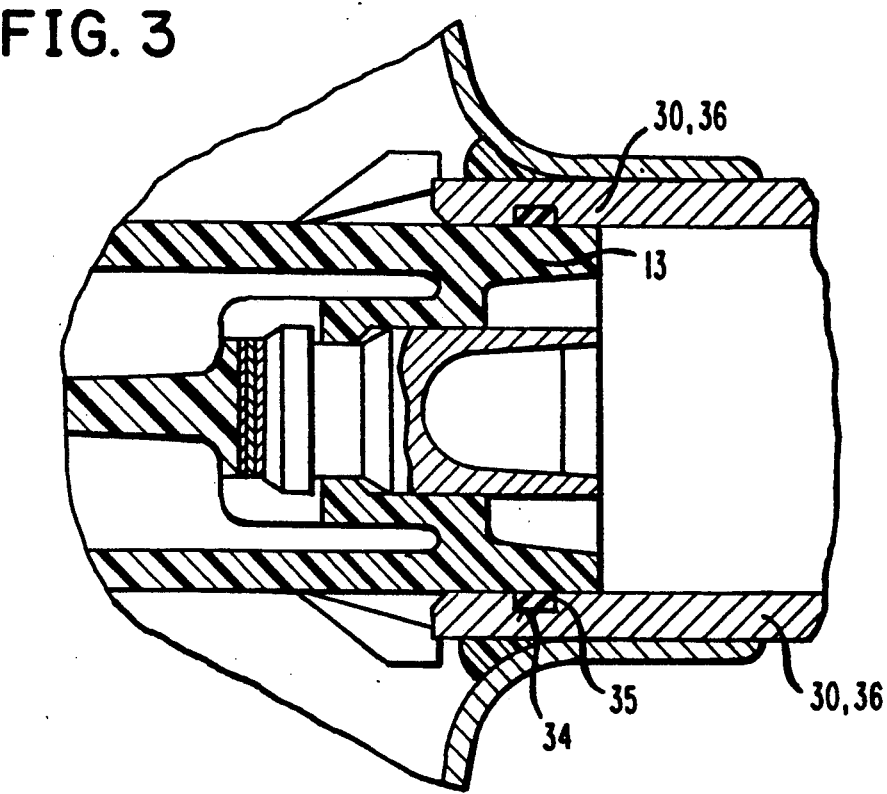
FIG. 3 illustrates details of the brake cylinder according to FIG. 1 in the area of the piston body.

A guide tube 30, as illustrated in FIG. 1, is rigidly connected to the casing half 2 and serves as a supporting element for the connection of the brake cylinder to the brake drum. The guide tube 30 is furnished with an inner tube region, formed as a gliding face 31. The piston shaft 13 is formed such, relative to the guide tube 30, that it is supported immediately sliding in the area of the gliding face 31. A seal 32 is disposed in the sliding area of the piston shaft 13 and of the guide tube 30. The piston shaft 13 is sealed against the guide tube 30 with the seal 32. The piston shaft 13 is furnished with an annular groove 33 disposed on the outside of the piston body in the region sliding in the guide tube, where the annular groove 33 serves for receiving of the seal 32 formed as an O-ring. Another embodiment is illustrated in FIG. 3, where the guide tube 30 is furnished with an annular groove 34 in the region sliding with the piston shaft 13, where a seal 35 is disposed in the annular shaped recess 34.

Figure 2:
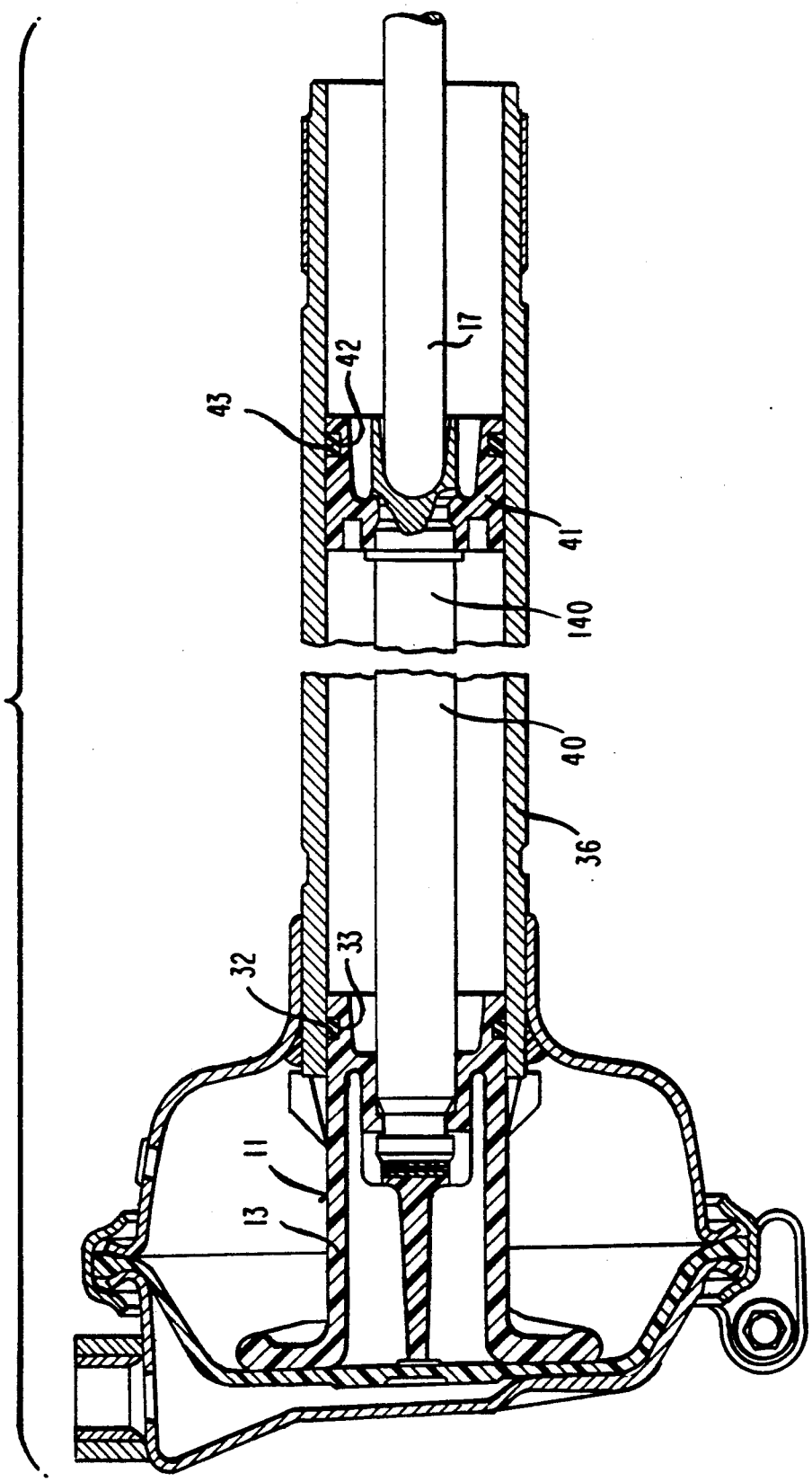
FIG. 2 shows a longitudinal sectional view of a variation of the brake cylinder of FIG. 1 including an extended pressure piece.

The guide tube 30, respectively 36, is furnished at its end disposed toward the piston 11 with a wiper ring 37, with a sealing lip 38, which sealing lip slidingly surrounds the piston shaft 13 according to the embodiments of FIGS. 1 and 2. The region of the piston shaft 13 sliding inside the guide tube 30 is to be kept free from impurities and soiling with the sealing lip 38, where the soiling and dirt contamination can occur and possibly penetrate into the chamber 9 via the breather bore 10.

A brake cylinder, corresponding to the one illustrated in FIG. 1, with the exception of the length of the guide tube, is illustrated in FIG. 2. A larger distance between the brake cylinder and the brake drum is to be bridged over with such an extended guide tube 36. The transfer elements disposed between the piston 11 and the actuator device for the braking jaws are also to be extended as a consequence of such construction. It would appear to be obvious to extend the actuator tappet 17 for the bridging of the larger distance by a corresponding amount. This, however, would generate undesired force components in case of difficult controllable alignment imprecisions and inaccuracies of the actuator tappet 17, relative to an operating axle of the actuator tappet, where the force components could lead to a single sided bearing load at the actuator tappet 17, based on its deflection under a bending load and at the actuator device for the brake shoes. The actuator tappet 17 is restricted to a length suitable and advantageous for these purposes based on the above recited reasons.

A larger distance can be achieved providing the required alignment precision of the transfer elements with an extended pressure piece 40, including a pressure piece extension 140 where the connection of the extended pressure piece 40 to the piston 11 with a guide piece 41 corresponds to pressure piece 15 according to FIG. 1, and where the extended pressure piece 40 is guided by the guide part 41 in the guide tube 36. The guide piece 41 is furnished with an annular recess 42 disposed at the outer side of the guide piece 41, where a seal 43 is disposed in the annular recess 42. The seal 43 is effective for furnishing sliding seal between the guide tube 36 and the guide piece 41 in the sense of a soil rejection in the gliding region of the guide piece 41. The guide piece 41 is form-lockingly connected to the pressure extension piece 140.

Figure 5:
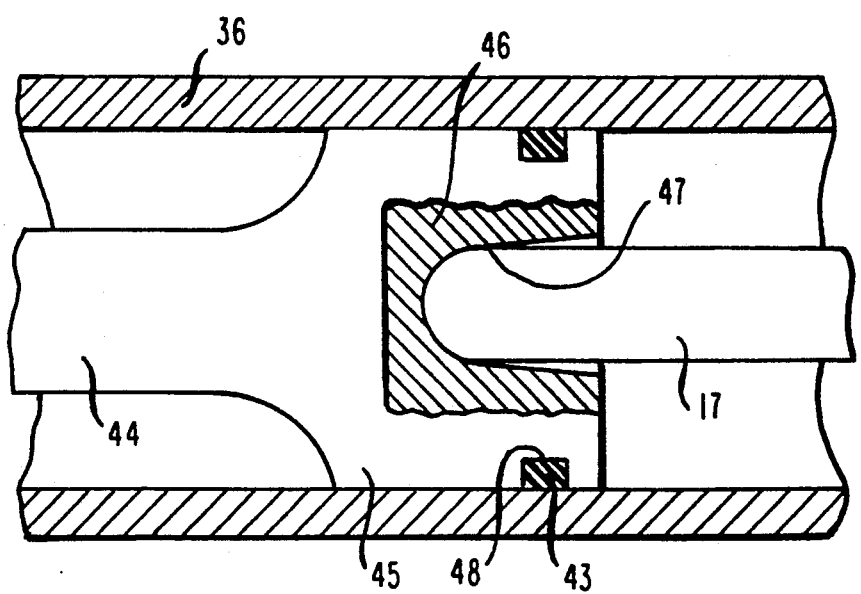
FIG. 5 is a sectional view similar to the right hand side of FIG. 2 illustrating details of another embodiment of a brake cylinder.

The guide piece 41 can be advantageously produced out of a plastic for saving weight and for a therewith associated reduction of the non-spring supported mass of the brake cylinder where the non spring supported mass tends to oscillate and vibrate. FIG. 5 illustrates a part of an extended pressure piece 44, which extended pressure piece 44 is to correspond to the pressure piece 15 of FIG. 1 and to the extended pressure piece 40 of FIG. 2, relative to the attachment to the piston 11. A guide piece 45 serves as a guide for the extended pressure piece 44 in the guide tube 39 and is formed together with the remaining part of the extended pressure piece 44 as a single element plastic mold part. The guide piece 45 is furnished with a part, serving as an insert 46 for the transfer of the actuating force from the extended pressure piece 44 to the actuator tappet 17, where the insert 46 is furnished with a recess 47 for receiving of the actuator tappet 17.

The insert 46 is formed as a part with a high wear resistance corresponding to its purpose of application.

The insert 46 can be retained in the guide piece 45 with a pressure fit. In case the extended pressure piece 44 and the guide piece 45 are formed as a single element plastic mold part, then the casting of the insert 46 into the guide piece 45 is available as an advantageous construction solution. An annular shaped molded recess 48 furnished in the guide piece 45 serves for receiving of the seal 43.

It will be understood that each of the elements described above, or two or more together, may also find a useful application in other types of force transmitting configurations and linking procedures differing from the types described above.

While the invention has been illustrated and described as embodied in the context of a brake cylinder for the actuation of a vehicle brake, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A brake cylinder for actuating a vehicle brake, wherein a brake cylinder comprises
   a movable membrane;
   a pressure chamber closed with the movable membrane;
   a fluid port attached to the pressure chamber for applying a pressure agent to the pressure chamber for inducing a brake actuation;
   a piston including a pressure plate and a piston body, wherein the piston with its pressure plate and its piston body is formed from a single element plastic mold part, where the piston is supported on the movable membrane and where the piston is adapted to perform a brake actuating stroke together with the movable membrane;
   an actuator tappet for transmitting a brake force to the brake;
   a pressure piece attached to the piston body at a free end of the piston body, where the pressure piece includes a recess serving for contacting and pushing the actuator tappet for the brake actuation;
   a guide tube disposed in the brake cylinder, where the piston body, the pressure piece and the actuator tappet are longitudinally movably disposed in the guide tube and wherein the piston body is directly and slidingly guided inside the guide tube;
   means for positively connecting the piston body and the pressure piece to each other.

2. The brake cylinder according to claim 1 further comprising
   a body seal disposed in a sliding region of the piston body and of the guide tube, wherein the piston body is sealed with the body seal relative to the guide tube.

3. The brake cylinder according to claim 2 wherein the piston body includes a body annular recess in the sliding region of the piston body sliding in the guide tube, wherein the body annular recess receives and supports the body seal.

4. The brake cylinder according to claim 2, wherein the guide tube includes a tube annular recess in a region of the guide tube sliding with the piston body, wherein the tube annular recess receives and supports a tube seal.

5. The brake cylinder according to claim 1, wherein the means for positively connecting the piston body and the pressure piece are formed by a catch connection disposed between the piston body and the pressure piece.

6. The brake cylinder according to claim 5, wherein the catch connection is formed by an annular recess of the pressure piece and by protrusions of the piston body, wherein said protrusions extend in a direction toward the annular recess.

7. The brake cylinder according to claim 6, wherein the piston includes a stop, wherein a front face of the pressure piece rests at said stop when the piston body and the pressure piece are in a locked catch connection.

8. The brake cylinder according to claim 7, wherein the stop and the catch connection are formed such and are disposed such, relative to each other, that a play distance is present between a front face of the stop and the front face of the pressure piece, wherein the front face of the stop and the front face of the pressure piece are disposed facing each other.

9. The brake cylinder according to claim 8 further comprising means for balance the play distance.

10. The brake cylinder according to claim 9, wherein the means for balancing the play distance are formed as washer disks.

11. The brake cylinder according to claim 8, wherein the means for balancing the play distance include a screw, screwed in along a longitudinal direction of the pressure piece, and a thread in the pressure piece.

12. The brake cylinder according to claim 1, wherein the pressure piece is longitudinally movable guided in the guide tube.

13. The brake cylinder according to claim 12, wherein the pressure piece is shape-matchingly and shape-lockingly connected to the guide piece for longitudinally guiding the pressure piece in the guide tube.

14. The brake cylinder according to claim 13 further comprising an extension seal, wherein the guide piece exhibits an extension annular recess for the extension seal and wherein the guide piece is sealed relative to the guide tube by the extension seal.

15. The brake cylinder according to claim 12, wherein the pressure piece is formed of a plastic mold part and wherein the pressure piece includes the recess receiving and pushing of the actuator tappet for the brake actuation.

16. The brake cylinder according to claim 15, wherein the recess is formed out of a part with high wear resistance, wherein the part forming the recess is connected with an end of the pressure piece disposed toward the actuator tappet.

17. The brake cylinder according to claim 16, wherein the part forming the recess is cast into the pressure piece.

18. The brake cylinder according to claim 15, wherein the pressure piece includes a guide piece serving for guiding the pressure piece in the guide tube, and wherein the pressure piece and the guide piece are formed of a single element plastic mold part.

19. The brake cylinder according to claim 18 further comprising an extension seal, wherein the guide piece includes an annularly shaped molded extension recess for receiving the extension seal.

20. The brake cylinder according to claim 1 further comprising
   a wiper ring, wherein the wiper ring is attached to the guide tube on a side disposed toward the piston; a sealing lip, wherein the sealing lip is attached to the guide tube on a side disposed toward the piston and wherein the sealing lip surrounds slidingly the piston body.

21. A brake cylinder for the actuating of a vehicle brake, comprising:
   a pressure chamber, closed with a movable membrane, where the pressure chamber is subjectable to a pressure agent for brake actuation;
   a piston, including a pressure plate and a piston body, wherein the pressure plate and the piston body are formed as a single element mold piece, where the piston is supported on a membrane and where the piston can perform a brake actuating stroke together with the membrane; a pressure piece disposed at a free end of the piston body, where the pressure piece includes a recess for receiving of an actuator tappet for a brake actuation;
   a guide tube, disposed at the brake cylinder, where the piston body, the pressure piece and the actuator tappet are longitudinally movably disposed in the guide tube;

wherein the piston (11) with its pressure plate (12) and its piston body (13) is formed from a single element plastic mold part, wherein the piston body (13) is directly and slidingly guided inside the guide tube (30, 36);

means for positively connecting the piston body (13) and the pressure plate (15, 40, 44) to each other.

22. The brake cylinder according to claim 21, wherein a body seal (32) is disposed in a sliding region of the piston body and of the guide tube (30, 36), by way of which body seal the piston body (13) is sealed relative to the guide tube (30, 36).

23. The brake cylinder according to claim 22, wherein the piston body (13) includes a body annular recess in the sliding region of the piston body (13) sliding in the guide tube (30, 36), wherein the body annular recess (33) receives and supports the body seal (32).

24. The brake cylinder according to claim 22, wherein the guide tube (30, 36) includes a tube annular recess (34) in a region of the guide tube (30, 36) sliding with the piston body (13), wherein the tube annular recess (34) receives and supports a tube seal (35).

25. The brake cylinder according to claim 21, wherein the means for positively connecting the piston body (13) and the pressure piece (15, 40, 44) are formed by a catch connection (20, 21), disposed between the piston body (13) and the pressure piece (15, 40, 44).

26. The brake cylinder according to claim 25, wherein the catch connection (20, 21) is formed by an annular recess (20) of the pressure piece (15, 40, 44) and by protrusions (21) of the piston body (13), wherein said protrusions (21) extend in a direction toward the annular recess (20).

27. The brake cylinder according to claim 26, wherein the piston (11) includes a stop (22), of the pressure piece (15, 40, 44) rests on said stop (22) when the piston body (13) and the pressure piece (15, 40, 44) are in a locked-in catch connection (20, 21).

28. The brake cylinder according to claim 27, wherein the stop (22) and the catch connection (20, 21) are formed such and are disposed such, relative to each other, that a play distance is present between a front facing each other.

29. The brake cylinder according to claim 28, wherein said play distance is balanced by means for balancing the play distance.

30. The brake cylinder according to claim 29, wherein the means for balancing the play distance are formed as washer disks (25).

31. The brake cylinder according to claim 28, wherein the means for balancing the play distance include a screw (27), screwed in along a longitudinal direction of the pressure piece (15, 40), and a thread (39) in the pressure piece (15, 40).

32. The brake cylinder according to claim 21, wherein the pressure piece (15, 40, 44) is longitudinally movably guided in the guide tube (30, 36).

33. The brake cylinder according to claim 32, wherein the pressure piece (40) is shape-matchingly and shape-lockingly connected to a guide piece (41) for longitudinally guiding the pressure piece (40) in the guide tube (36).

34. The brake cylinder according to claim 33, wherein the guide piece (41) includes an extension annular recess (42) with an extension seal (43), and wherein the guide piece (41) is sealed relative to the guide tube (36) by the extension seal (43).

35. The brake cylinder according to claim 32, wherein the pressure piece (44) is formed of a plastic mold part and wherein the pressure piece (44) includes the recess (47) receiving the actuator tappet (17) for the brake actuation.

36. The brake cylinder according to claim 35, wherein the recess (47) is formed out of a part (46) with high wear resistance, where the part (46) is connected with the end of the pressure piece (44) disposed toward the actuator tappet (17).

37. The brake cylinder according to claim 36, wherein the part (46) forming the recess (47) is cast into the pressure piece (44).

38. The brake cylinder according to claim 35, wherein the pressure piece (44) includes a guide piece (45) serving for guiding the pressure piece (44) and the guide piece (45) are formed of a single element plastic mold part.

39. The brake cylinder according to claim 38, wherein the guide piece (45) includes an annularly shaped molded extension recess (48) for receiving an extension seal (43).

40. The brake cylinder according to claim 21, wherein the guide tube (30, 36) includes a wiper ring (37) at an end of the guide tube (30, 36) facing toward the piston (11), and a sealing lip (38), wherein the sealing lip (38) surrounds slidingly the piston body (13).

* * * * *